Dec. 15, 1959  K. J. STEWART ET AL  2,916,836
PHOTOELECTRIC AUTOMATIC BLADE LEVEL CONTROL
Filed June 24, 1955  4 Sheets-Sheet 2
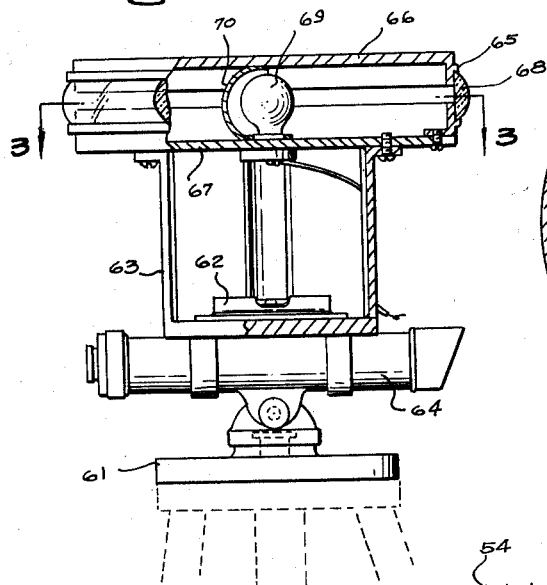
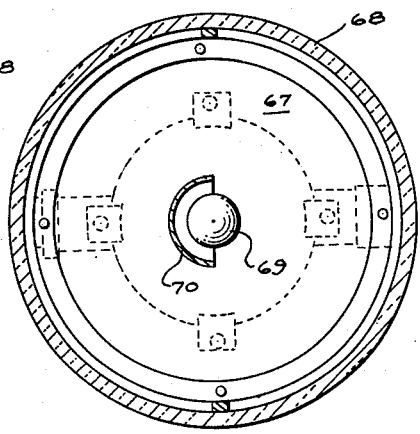
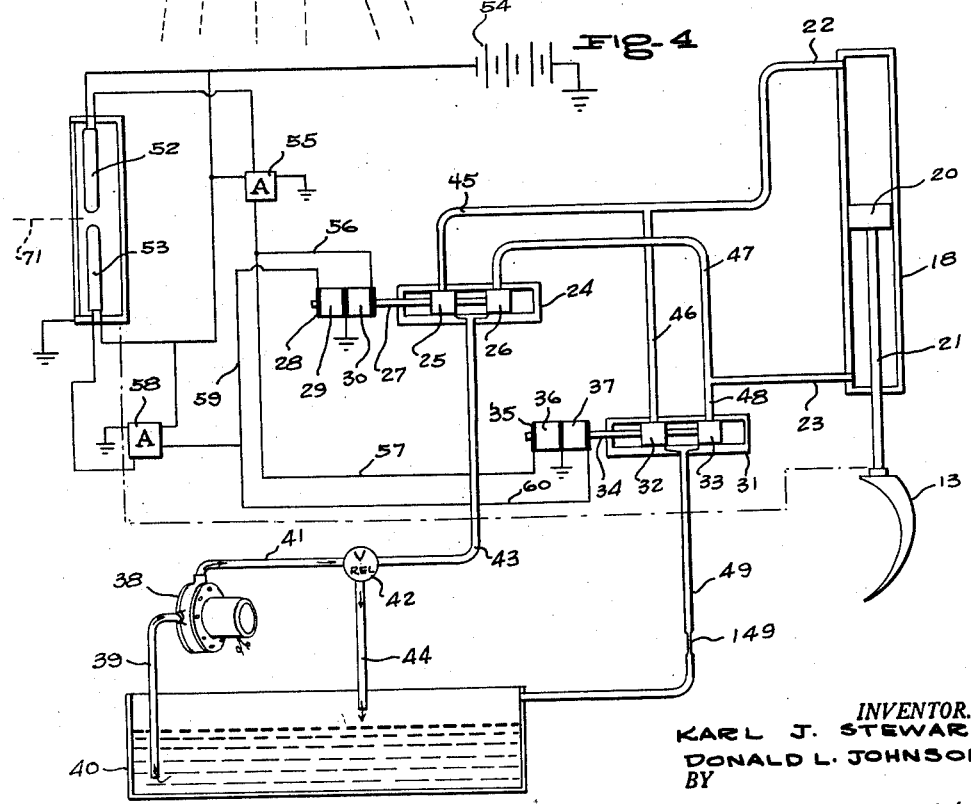
INVENTOR.
KARL J. STEWART
DONALD L. JOHNSON
BY
McMorrow, Berman + Davidson
ATTORNEYS

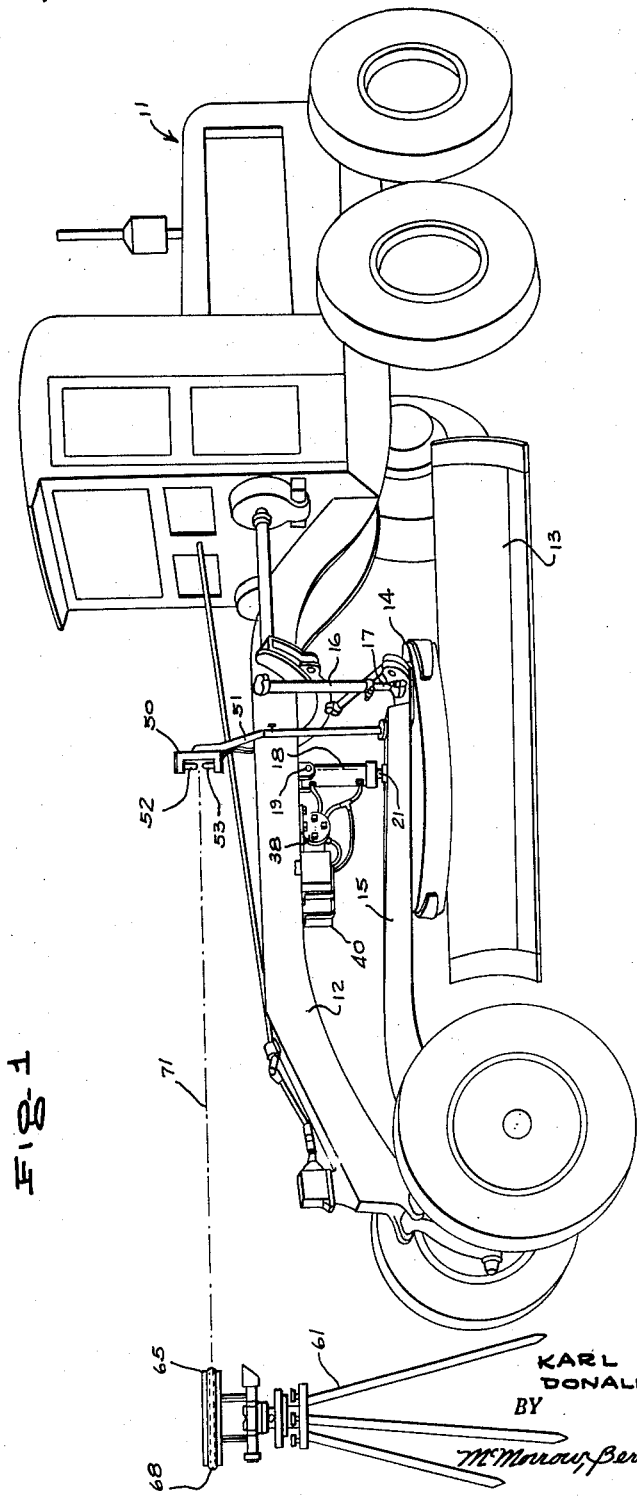

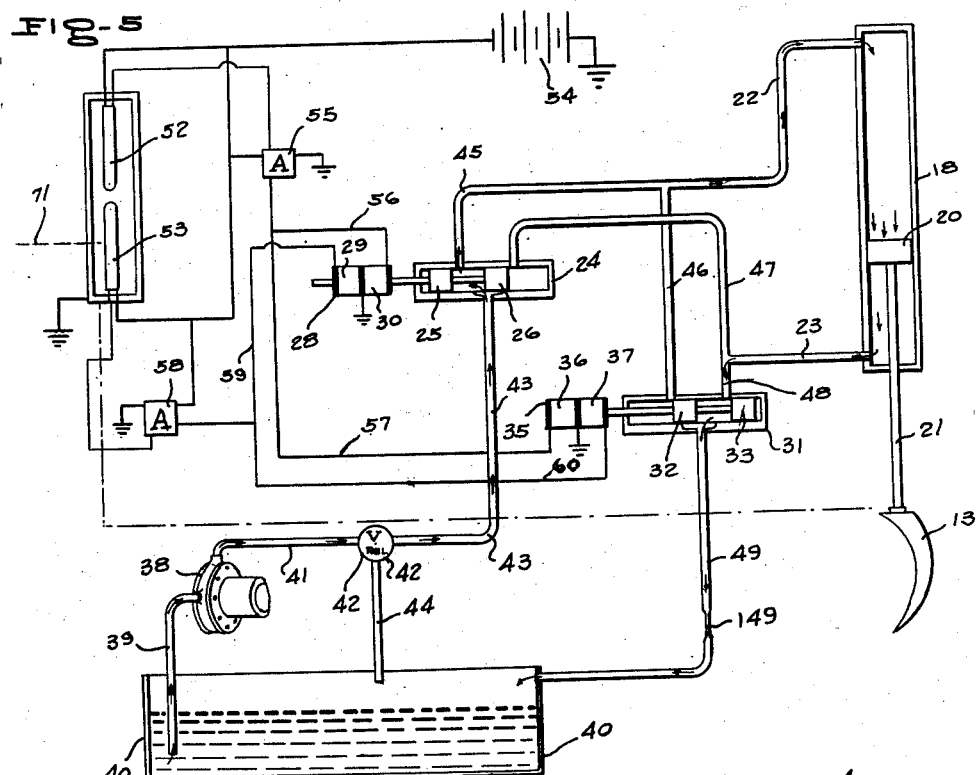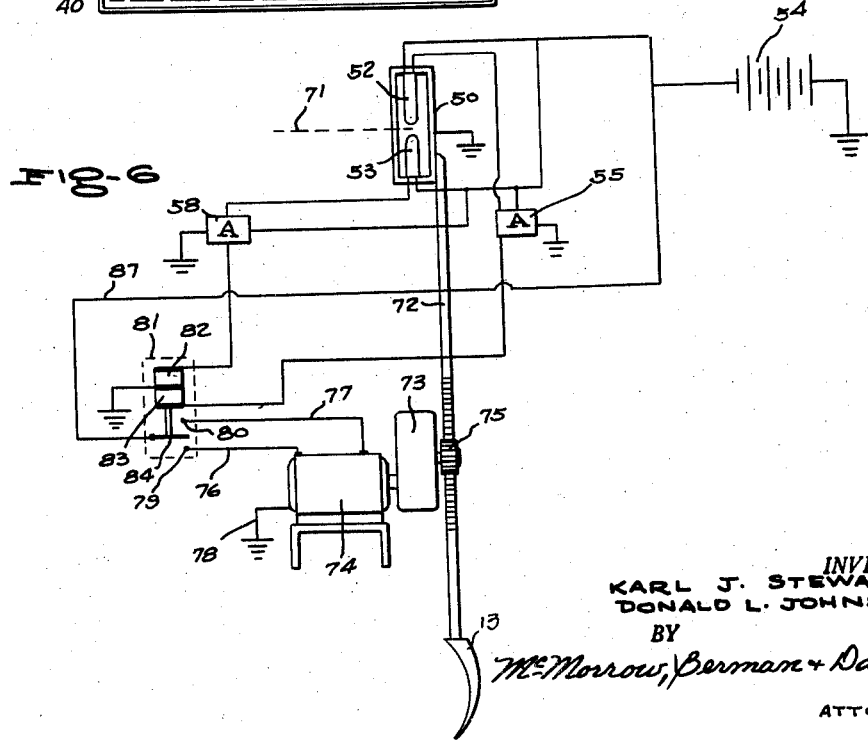

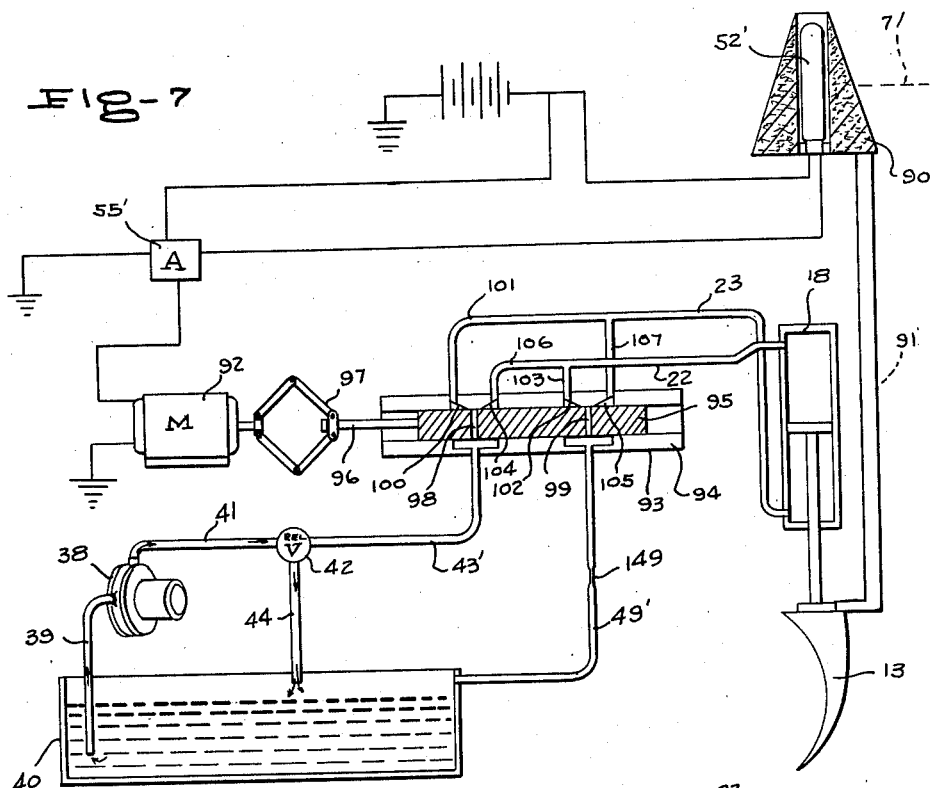
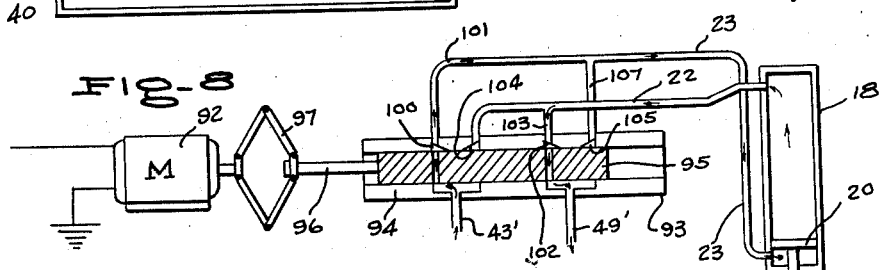
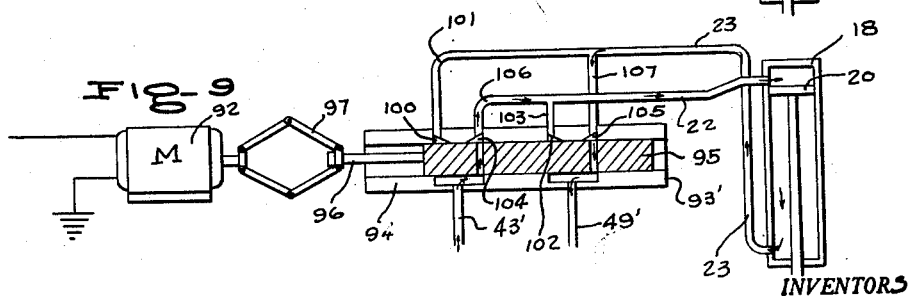

United States Patent Office 2,916,836
Patented Dec. 15, 1959

2,916,836

PHOTOELECTRIC AUTOMATIC BLADE LEVEL CONTROL

Karl J. Stewart, Nyssa, Oreg., and Donald L. Johnson, Nampa, Idaho

Application June 24, 1955, Serial No. 517,868

9 Claims. (Cl. 37—143)

This invention relates to leveling machines, and more particularly to an improved automatic control device to regulate the height of the scraper blade of a leveling machine.

A main object of the invention is to provide a novel and improved automatic leveling control means for the blade of a leveling machine, grading machine, or similar apparatus such as is employed in grading roads, streets, aircraft runways, or the like, the improved control device being simple in construction, being reliable in operation, and involving relatively few parts.

A further object of the invention is to provide an improved blade control means for automatically adjusting the elevation of the blade of a leveling machine, or the like, such as is employed in road or street grading, aircraft runway grading, excavating for building foundations, ditch excavating, for constructing tunnels, or for any other application involving leveling and maintaining an exact grade, the improved control device involving inexpensive components, being durable in construction, and requiring a minimum amount of human supervision.

Further objects and advantages of the invention will become apparent from the following description and claims, and from the accompanying drawings, wherein:

Figure 1 is a perspective view of a grading machine and showing the provision of automatic blade control means constructed in accordance with the present invention for regulating the elevation of the blade of the machine.

Figure 2 is an elevational view, partly in vertical cross section, of the collimated light source employed with the device of Figure 1.

Figure 3 is a horizontal cross sectional view taken on line 3—3 of Figure 2.

Figure 4 is a diagram illustrating the electrical and hydraulic connections of the form of blade level control device of Figure 1.

Figure 5 is a diagram similar to Figure 4 but showing the device operating to lower the blade.

Figure 6 is a diagram illustrating a modified form of leveling blade control device according to the present invention.

Figure 7 is a diagram illustrating the electrical and hydraulic connections of a further modified form of level blade control device according to the present invention, shown with the control elements in a neutral position.

Figure 8 is a diagrammatic view of a portion of the system of Figure 7, with the blade in a lowered position, and beginning to rise.

Figure 9 is a diagram similar to Figure 8 but showing the arrangement of the elements with the blade in a raised position, and in the process of being lowered.

Referring to the drawings, 11 designates a leveling machine of substantially conventional construction, said machine including the usual frame 12 and a ground-engaging scraper blade 13 which is movably supported by the frame 12 for vertical adjustment. For example, the blade 13 may be supported by conventional bracket means 14 including a pivoted arm 15 and a guide sleeve 16 which slidably receives a guide rod 17, whereby the blade 13 is guided for substantially vertical movement. The vertical movement of the blade 13 is controlled by a fluid pressure cylinder 18 which is pivoted at 19 to the upper portion of the frame 12 shown in Figure 1 and which depends therefrom, said cylinder 18 being provided with a piston 20 having the depending piston rod 21 which is secured to the member 15, and which is thus, in effect, connected to the blade 13 in the manner diagrammatically illustrated in Figure 4.

Connected to the top end portion of the cylinder 18 is a fluid conduit 22 and connected to the bottom end portion of said cylinder is another fluid conduit 23. Designated generally at 24 is a first control valve which includes spaced piston elements 25 and 26 which are connected to common plunger rod 27 slidably received in a double electro magnet 28 including respective windings 29 and 30. Windings 29 and 30 are suitably arranged with respect to a magnetic plunger on rod 27, so that when magnet winding 29 is energized the pistons 25 and 26 will be moved to the left, as viewed in Figure 4, for example, to the positions thereof shown in Figure 5, and conversely, when the magnet winding 30 is energized, the pistons 25 and 26 will be moved to the right, as viewed in Figure 4. Designated at 31 is a similar fluid pressure valve comprising piston elements 32 and 33 which are spaced apart and which are connected to a common plnger rod 34 slidably received in a double wound electro magnet 35 comprising respective windings 36 and 37. The windings 36 and 37 are so arranged with respect to a magnet plunger on rod 34 that when winding 36 is energized, the piston elements 32 and 33 will be moved to the left, and that when the winding 37 is energized, the piston elements 32 and 33 will be moved to the right, for example, to the positions thereof shown in Figure 5. Suitable spring means, not shown, biases the elements to their positions of Figure 4.

Designated at 38 is a pump having an inlet conduit 39 connected thereto and communicating with the lower portion of a fluid reservoir 40. The pump 38 has the outlet conduit 41 which is connected through a pressure-responsive relief valve 42 to a conduit 43 connected to the housing of the valve 24 and communicating with the space in said housing normally between the pistons 25 and 26 when said pistons are in their neutral positions to which they are biased by suitable spring means, not shown. The relief valve 42 is provided with the discharge conduit 44 extending into the reservoir 40, whereby fluid from the pump 38 normally is discharged into the reservoir when the valve 24 is in its neutral or closed position, shown in Figure 4, since the valve 42 opens to bypass fluid into the reservoir 40 through the conduit 44 when excessive pressure is built up in the conduit 43.

Designated at 45 is a conduit which connects the space above the piston 25, in its neutral position of Figure 4, to the conduit 22, and designated at 46 is a similar conduit which connects the space above the piston 32, in the neutral position of said piston, to the conduit 22. Designated at 47 is a conduit which connects the space above piston 26, in its neutral position, to the conduit 23, and designated at 48 is a conduit which connects the space above the piston 33, in its neutral position, to said conduit 23. Designated at 49 is a conduit which connects the space of the housing of valve 31 between pistons 32 and 33, in their neutral positions shown in Figure 4, to the reservoir 40 to allow return of fluid from valve 31 to said reservoir. Conduit 49 preferably contains a restricted portion 149 to retard transfer of liquid to the reservoir 40 and to prevent excessive jumping of the blade 13 and to permit steady control of said blade.

Designated at 50 is a suitable support which is mechanically coupled to blade 13, as by being mounted on a standard 51 secured on the end of the arm 15 over the blade 13. Mounted in the support 50 are a pair of vertically spaced photo-electric cells 52 and 53, said cells being vertically aligned and being spaced apart by a short distance, as is diagrammatically illustrated in Figure 4. The support 50 is in the form of a housing which is open and which is shaped to expose the photoelectric cells 52 and 53 to light reaching the housing from any direction with respect to the machine 11.

Support 50 is vertically adjustable to enable the operator to set said support for an initial "zero" position. This may be accomplished by employing telescopic sections in the standard 51 and by providing set screws, or similar fastening means for locking the sections in adjusted positions.

As shown in Figure 4, the photo-electric cell 52 is connected between a suitable source of current 54 and a suitable electronic relay device 55, such as a conventional vacuum tube amplifier, to control said amplifier, said amplifier 55 being connected to control the energization of the magnet valve windings 30 and 36. Thus, the windings 30 and 36 may be connected by suitable wires 56 and 57 in the plate circuit of the output tube of the amplifier 55, and the current in said plate circuit may be controlled in a conventional manner by the photoelectric cell 52 so that when said photo-electric cell 52 is rendered conductive, as by the reception of substantial light flux, the amplifier is triggered and causes substantial plate current to develop in its output circuit, energizing the magnet windings 30 and 36.

Similarly, the photo-electric cell 53 is connected so as to control an electronic relay device 58 whose output circuit is connected to the magnet windings 29 and 37, as by wires 59 and 60, so that the magnet windings 29 and 37 are energized responsive to the reception of a substantial quantity of light flux by the photo-electric cell 53.

The various elements of the device, including the valves 24 and 31, the power supply 54, the pump 38, and the fluid reservoir 40 are mounted in any suitable manner on the frame 12 of the machine 11, for example, in the manner illustrated in Figure 1.

As above explained, the housing 50 containing the photo-electric cells 52 and 53 is supported on the movable structure associated with the blade 13 and moves with the blade 13.

Designated at 61 is a conventional transit provided with the level tube 62, mounted on a bracket member 63 which is secured to the telescope 64 of the transit. Secured on the bracket 63 parallel to the level tube 62 and the telescope 64, is a generally circular housing 65 comprising an opaque top segment 66 and an opaque bottom segment 67 connected at their rim portions by an annular cylindrical lens 68. Centrally mounted in the housing 65, for example, on the central portion of the bottom segment 67 is a radiation source 69, for example, an incandescent lamp, provided with a suitable reflector 70 arranged to provide a relatively wide angle of projection forwardly of the light from the lamp 69, through the lens 68, for example, a projection of one hundred and eighty degrees or more in the horizontal plane defined by the lens 68. The lens 68 is suitably dimensioned to collimate the light from the lamp 69 to project said light substantially in a horizontal plane and in a relatively concentrated horizontal sheet. Since the housing 65 is parallel to the level 62, the level 62 may be employed to accurately position the housing 65 horizontally to provide a desired horizontal distribution of the flux from the lamp 69.

Special profile lenses or templates may be employed to cover situations which do not require an exactly horizontal distribution of light, for example, where grades are not to be held constant (for instance, in the case of a road under construction which may interchain to ridges with a ravine between, which would normally call for a machine working at several different levels and grades). The light source may be off to a side of the job and still effectively control the machine from forward, rear and side positions. Thus the device is not limited to only horizontal control, but may be employed in profile or other grade work.

The flux generating means shown in Figures 2 and 3 is employed to establish the neutral position of the leveling blade 13 in the manner clearly illustrated in Figure 1, wherein the collimated horizontal sheet of light flux, shown at 71 normally passes between the spaced photoelectric cells 52 and 53, whereby the piston 20 of cylinder 18 remains in its median position. When the machine 11 moves upwardly with respect to its normal position of Figure 1, the horizontal reference light flux sheet 71 is received by the lower photo-electric cell 53, energizing the electronic relay device 58, and thereby energizing the magnet windings 29 and 37. As shown in Figure 5, this causes pistons 25 and 26 to be moved to the left from their positions of Figure 4 and pistons 32 and 33 to be moved to the right from their positions of Figure 4. This establishes communication between the fluid conduit 43 and the fluid conduit 45, allowing hydraulic fluid to be discharged through conduit 22 into the upper portion of cylinder 18, and at the same time establishes communication between conduit 49 and conduits 23 and 48, allowing hydraulic fluid to be discharged from the lower portion of cylinder 18 into the fluid reservoir 40. The fluid under pressure in the upper portion of the cylinder 18 acts on the blade 13 to move the blade downwardly a sufficient distance so that the photo-electric cell 53 moves downwardly and no longer receives the horizontal light flux 71. When this occurs, the electronic valve device 58 is no longer energized, and the valve pistons 25, 26 and 32, 33 return to their neutral positions toward which they are biased by suitable conventional spring means provided in the valves 24 and 31. Should the blade 13 continue to descend, the housing 50 will be lowered sufficiently so that the horizontal light flux sheet 71 will be received by the upper photo-electric cell 52. This causes the electronic relay device 55 to be energized, which in turn causes the magnet windings 30 and 36 to be energized. The piston elements 25 and 26 would then be moved to the right, as viewed in Figure 4, and the piston elements 32 and 33 would be moved to the left. This would establish communication between conduit 43 and the conduits 47 and 23, causing fluid under pressure to be admitted into the lower portion of cylinder 18 and would establish communication between conduits 22 and 46 and the conduit 49, and the conduits 46 and 22, allowing fluid to be discharged from the upper portion of cylinder 18 into the reservoir 40. The fluid pressure provided in the lower portion of the cylinder 18 would cause the blade 13 to be elevated, and the upward movement of the blade 13 would continue until the upper photo-electric cell 52 no longer received the horizontal light flux 71, whereupon the elements return to their neutral positions of Figure 4. Therefore, from the above description, it will be readily apparent that the level of the blade 13 is controlled in accordance with the elevation of the light flux plane 71 which is in turn regulated by the elevation of the light source 69 and the orientation of the plane of housing 65. As above explained, this orientation may be accurately set to be in a desired plane, or to any specified grade or grades, by means of the level tube 62 and vernier of transit 61.

Referring now to the modification shown in Figure 6, in this form of the invention, the photo-electric cell housing 50 is mounted on the end of a vertical rack bar 72 which is connected to or is otherwise suitably mechanically coupled to the leveling blade 13. A reversible electric motor 74 is mounted on the frame of the leveling machine and the shaft of said motor is coupled through a gear reduction unit 73 to a rack gear 75 meshing with the rack bar 72. The reversible electric motor 74 has respective opposing windings having respective input leads 76 and 77 and a common grounded lead 78, the leads 76 and 77 being connected to respective stationary contacts 79 and 80 of a double-wound relay 81 having the respective magnet windings 82 and 83 which are suitably arranged with respect to a magnetic plunger element connected to the armature of the relay so that when the winding 82 is energized, the pivoted armature of the relay, shown at 84 will be moved upwardly to engage the contact 80 and energize the motor 74 in a direction to move the blade 13 downwardly, and conversely, when the winding 83 is energized, the armature 84 will be moved downwardly to engage the contact 79 and to energize the motor 74 in a direction to move the blade 13 upwardly. Suitable conventional spring means, not shown, biases the armature 84 to its neutral, non-contacting position shown in Figure 6.

As shown in Figure 6, the armature 84 is connected by a wire 87 to the ungrounded terminal of the current source 54, so that said current source is connected to one of the energizing windings of the motor when the corresponding magnet winding 82 or 83 is energized. The magnet winding 82 is connected in the output circuit of the electronic relay device 58, and the magnet winding 83 is connected in the output circuit of the electronic relay device 55. Therefore, when the horizontal light flux 71 engages the lower photo-electric cell 53, the electronic relay 58 is energized, causing the winding 82 to be energized, which in turn energizes the winding of motor 74 required to drive rack bar 72 downwardly, thus lowering the blade 13 sufficiently so that the light flux 71 no longer engages the lower photo cell 53. Conversely, when the horizontal light flux 71 is received by the upper cell 52, the electronic relay device 55 is energized, causing the magnet winding 83 to be energized, and producing energization of the winding of motor 74 required to drive the rack bar 72 upwardly.

Referring now to the form of the invention shown in Figures 7, 8, and 8, a photo-electric cell 52', surrounded by a conical light absorber or filter 90 is mechanically coupled to the leveling blade 13 as by being mounted on a suitable supporting arm 91. The conical light filter 90 is formed of any suitable homogeneous semi-transparent material and tapers upwardly in thickness, so that varying amounts of flux pass therethrough to the photo-electric cell 52' in accordance with variations in elevation of the blade 13. The photo-electric cell 52' is connected to the input circuit of an electronic amplifier 55' and controls the output current of the amplifier in accordance with the amount of light flux received by the photo-electric cell 52', since the conductivity of said photo-electric cell depends upon such received flux. Connected in the output circuit of the amplifier 55' is an electric motor 92 which rotates at a speed in accordance with the amount of output current supplied by the amplifier 55'. Designated at 93 is a slide valve comprising a housing 94 containing a double-apertured slide elemet 95, said element being provided with the operating rod 96 which is rotatably coupled to one end of a centrifugal governor device 97 driven by the shaft of motor 92. In a neutral position of the blade 13, such as that shown in Figure 7, the governor device 97 will assume the configuration of Figure 7 and will maintain the apertures 98 and 99 of the slide element 95 in centered, sealed positions with respect to respective variable area orfice ports 100 and 104 provided in the top wall of the slide housing 94 on opposite sides of the centered position of apertures 98 and variable area ports 102 and 105 provided in the top wall of the housing 94 on opposite sides of the centered position of the aperture 99. As shown in Figure 8, when the valve element 95 is moved to the left, as when the motor 92 increases in speed, the aperture 98 is in registry with the variable area orifice 100 and the aperture 99 is in registry with the variable area orifice 102. The port 100 is connected by a conduit 101 to the conduit 23, leading to the lower portion of the cylinder 18, and the port 102 is connected by a conduit 103 to the conduit 22 connected to the top portion of cylinder 18. Similarly, the port 104 is connected by a conduit 106 to the conduit 22 and the port 105 is connected by a conduit 107 to the conduit 23.

The fluid pressure output line, shown at 43', is connected to the bottom of the slide valve housing 94 and is in communication with the aperture 98. The return conduit 49' is connected to the bottom of the slide valve housing 94 and is in communication with the aperture 99.

Assuming that the blade 13 drops below its desired elevation, the conical filter 90 and photo cell 52' drop with the blade, providing an increase in light flux received by the photo-electric cell 52'. This causes the output of the amplifier 55' to increase, increasing the speed of the motor 92, and causing the centrifugal governor device 97 to assume a configuration such as that shown in Figure 8, whereby the slide valve element 95 is moved to the left, connecting the fluid supply conduit 43' to the conduit 101 through the aperture 98, introducing fluid under pressure to the lower portion of the cylinder 18 through the conduit 23, and connecting the return line 49' to the conduit 103 and return conduit 22, allowing fluid to be discharged from the upper portion of the cylinder 18 to the reservoir 40. The fluid pressure applied to the piston 20 by the fluid therebeneath causes the piston to rise and causes the blade 13 to be elevated until the flux transmitted through the filter 90 to the photo-electric cell 52' reduces sufficiently to reduce the speed of motor 92 to a value such that the apertures 98 and 99 reach their centered, sealed positions, shown in Figure 7.

Similarly, if the blade 13 rises above its desired elevation, the flux from the horizontal light beam 71 is reduced because of the increased thickness of the filter 90, whereby the conductivity of the photo-electric cell 52' is reduced, reducing the output of the amplifier 55' and reducing the speed of the motor 92, whereupon the centrifugal device 97 assumes the configuration of Figure 9, causing the slide valve element 95 to be moved to the right. This connects the fluid pressure supply line 43' to the top portion of cylinder 18 and connects the return line 49' to the lower portion of said cylinder, causing the blade 13 to be lowered to a position such that sufficient flux reaches the photo-electric cell 52' to cause the speed of the motor 92 to increase sufficiently to move the apertures 98 and 99 to their sealed positions, as in Figure 7.

While certain specific embodiments of an improved means for controlling the level of the blade of a leveling machine have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination, a visible radiation source, an annular cylindrical lens surrounding said source and collimating the flux from said source in a relatively narrow plane to define a fixed reference level, a movable leveling machine including a frame, a ground-engaging blade movably mounted on said frame, motor means formed and arranged to move said blade vertically, a control circuit connected to said motor means, a radiation-sensitive device supported on said blade to move vertically therewith and being arranged to at times receive said flux, and means whereby said radiation-sensitive device actuates said control circuit.

2. In combination, a light source, an annular cylindrical lens surrounding said source and collimating the flux from said source in substantially a single plane to define a fixed reference level, a movable leveling machine comprising a frame, a ground-engaging blade movably mounted on said frame, fluid pressure means on said frame connected to said blade and being formed and arranged to at times move the blade vertically, electrical means formed and arranged to control said fluid pressure means, and photo-sensitive means mechanically coupled with said blade to move vertically therewith and being formed and arranged to control said electrical means.

3. In combination, a light source, an annular cylindrical lens surrounding said source and collimating the flux from said source in substantially a single plane to define a fixed reference level, a movable leveling machine comprising a frame, a ground-engaging blade movably mounted on said frame, fluid pressure means on said frame connected to said blade and being formed and arranged to at times move the blade vertically, electrically operated valve means on said frame formed and arranged to control said fluid pressure means, photo-sensitive means mechanically coupled with said blade to move vertically therewith, and circuit means controllingly interconnecting said photo-sensitive means and said valve means.

4. In combination, a light source, an annular cylindrical lens surrounding said source and collimating the flux from said source in substantially a single plane to define a fixed reference level, a movable leveling machine comprising a frame, a ground-engaging blade movably mounted on said frame, fluid pressure means on said frame connected to said blade and being formed and arranged to at times move the blade vertically, respective electrical valve means on said frame controlling the fluid pressure means and formed and arranged to energize said fluid pressure means to move the blade respectively upwardly and downwardly responsive to the respective energization of said electrical valve means, a pair of vertically spaced photo-sensitive elements located above and below said plane, means coupling said photo-sensitive elements to said blade to move vertically therewith, and respective circuit means controllingly interconnecting the respective photo-sensitive elements and the respective electrical valve means.

5. In combination, a visible radiation source, an annular cylindrical lens surrounding said source and collimating the flux from said source in a relatively narrow plane to define a fixed reference level, a movable leveling machine including a frame, a ground-engaging blade movably mounted on said frame, motor means formed and arranged to move said blade vertically, a control circuit connected to said motor means, a pair of vertically spaced radiation-sensitive devices supported on said blade to move vertically therewith and being arranged to at times receive said flux, and means whereby said radiation-sensitive devices selectively actuate said control circuit 6. In combination, a light source, an annular cylindrical lens surrounding said source and collimating the flux from said source in substantially a single plane including said source to define a fixed reference level, a movable leveling machine comprising a frame, a ground-pressure means on said frame connected to said blade engaging blade movably mounted on said frame, fluid and being formed and arranged to at times move the blade vertically, electrical means formed and arranged to control said fluid pressure means, and a pair of vertically spaced photo cells mechanically coupled with said blade to move vertically therewith and being formed and arranged to control said electrical means.

7. In combination, a visible radiation source, an annular cylindrical lens surrounding said source and collimating the flux from said source in a relatively flat beam to define a fixed reference level, a movable leveling machine including a frame, a ground-engaging blade movably mounted on said frame, motor means formed and arranged to move said blade vertically, a control circuit connected to said motor means, a pair of vertically spaced radiation-sensitive devices supported on said blade to move vertically therewith and being arranged to at times receive said flux, and means whereby said radiation-sensitive devices selectively actuate said control circuit.

8. In combination, a source of visible light, an annular lens surrounding said source and being formed and arranged to collimate the flux from said source in substantially a single plane to define a fixed reference level, a movable leveling machine comprising a frame, a ground-engaging blade movably mounted on said frame, reversible means formed and arranged to move the blade vertically, circuit means formed and arranged to actuate said blade-moving means, a photo electric cell, means mechanically coupling said photo electric cell to said blade adjacent said plane to move vertically therewith, and means controllingly connecting said photo electric cell to said circuit means.

9. In combination, a source of visible light, an annular lens surrounding said source and being formed and arranged to collimate the flux from said source in substantially a single plane including said source to define a fixed reference level, a movable leveling machine comprising a frame, a ground-engaging blade movably mounted on said frame, reversible means formed and arranged to move the blade vertically, electrical means on said frame formed and arranged to regulate the vertical movement of said blade, a photo electric cell supported by said blade adjacent said plane to move vertically therewith, and means connecting said photo electric cell to said electrical means.

References Cited in the file of this patent

UNITED STATES PATENTS

| | | |
|---|---|---|
| 2,268,017 | Busick et al. | Dec. 30, 1941 |
| 2,283,036 | Bohn | May 12, 1942 |
| 2,366,939 | Smith et al. | Jan. 9, 1945 |
| 2,489,219 | Herbold | Nov. 22, 1949 |
| 2,636,290 | Bell | Apr. 28, 1953 |
| 2,796,685 | Bensinger | June 25, 1957 |